United States Patent
Shaver et al.

(10) Patent No.: US 7,283,069 B2
(45) Date of Patent: Oct. 16, 2007

(54) METHOD FOR ENCODED OR ENCRYPTED BIT STREAM SYNCHRONIZATION

(75) Inventors: Joseph Shaver, Rochester, NY (US); Paul Voglewede, N. Chili, NY (US); Edwin Leiby, Avon, NY (US); Mark Walter Chamberlain, Honeoye Falls, NY (US); Eric Peach, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/377,492

(22) Filed: Mar. 16, 2006

(65) Prior Publication Data

US 2007/0216549 A1    Sep. 20, 2007

(51) Int. Cl.
*H03M 7/46* (2006.01)

(52) U.S. Cl. .............. 341/63; 341/59; 341/67; 375/145

(58) Field of Classification Search ............ 341/63, 341/59, 67; 375/145, 354; 706/12; 370/347
See application file for complete search history.

(56) References Cited

U.S. PATENT DOCUMENTS

| 4,527,275 | A | * | 7/1985 | Russell | 375/145 |
|---|---|---|---|---|---|
| 5,479,448 | A | * | 12/1995 | Seshadri | 375/267 |
| 5,572,208 | A | * | 11/1996 | Wu | 341/67 |
| 6,184,806 | B1 | * | 2/2001 | Patapoutian et al. | 341/59 |
| 6,356,607 | B1 | * | 3/2002 | Scott et al. | 375/354 |
| 7,042,868 | B2 | * | 5/2006 | Runkle et al. | 370/347 |
| 7,095,341 | B2 | * | 8/2006 | Hsiun | 341/67 |
| 2002/0174078 | A1 | * | 11/2002 | Mitsutani | 706/12 |
| 2005/0046602 | A1 | * | 3/2005 | Hayami | 341/59 |

* cited by examiner

*Primary Examiner*—Jean Bruner Jeanglaude

(57) ABSTRACT

An improved method is provided for identifying a repeated codeword in an incoming bit stream. The method includes: receiving an incoming bit stream having an expected codeword repeated a number of times; determining whether a group of incoming data bits correlates to the expected codeword, where each of the incoming data bits in the group need not match the corresponding data bit of the expected codeword; and determining whether the expected code word is repeated over a sequence of incoming data bits.

Figure 1:
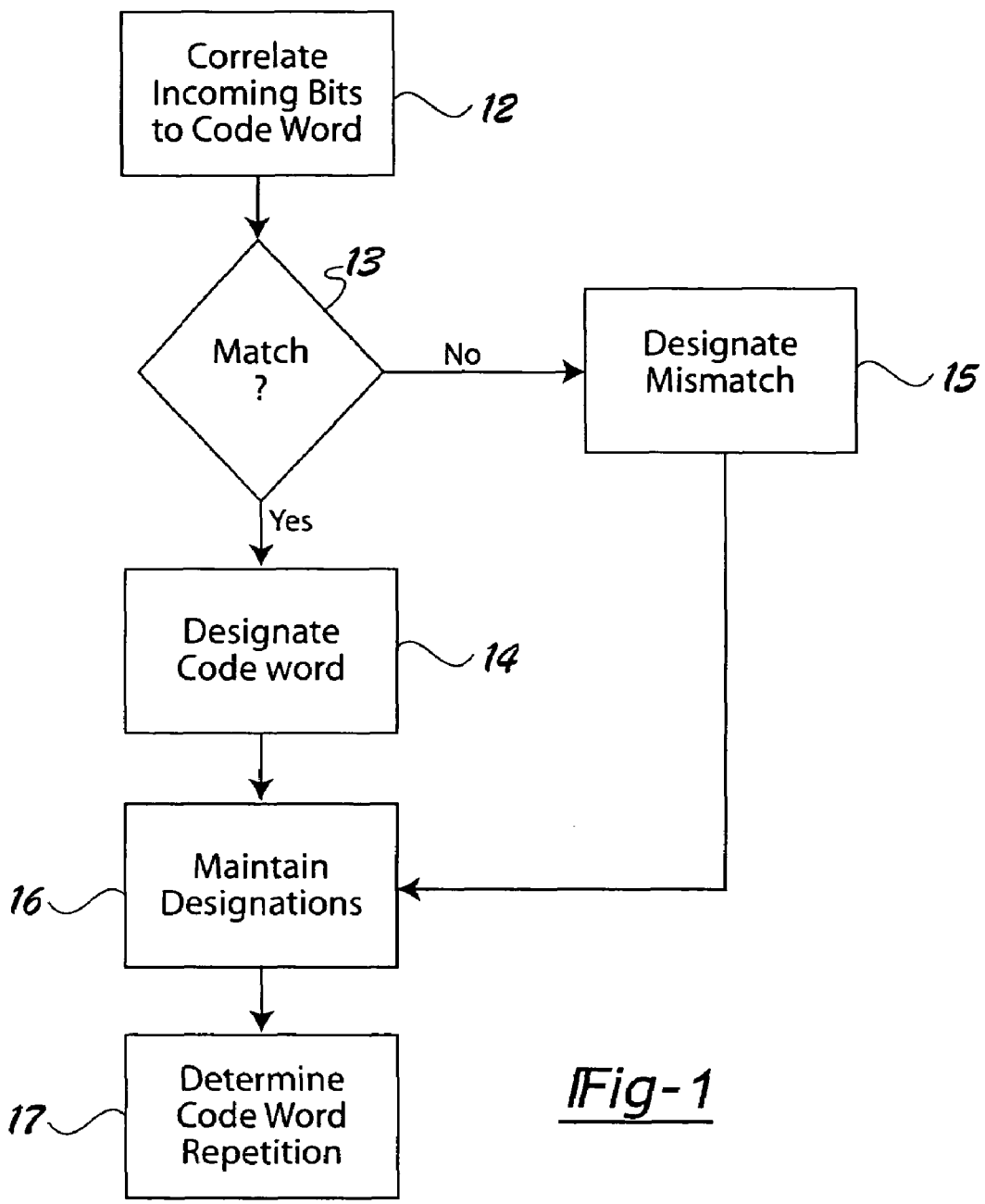

15 Claims, 1 Drawing Sheet

METHOD FOR ENCODED OR ENCRYPTED BIT STREAM SYNCHRONIZATION

FIELD

The present disclosure relates generally to frequency hopping communication systems and, more particularly, to a robust technique for identifying a synchronization pattern within an incoming bit stream.

BACKGROUND

A frequency hopping communications system utilizes many frequency channels to send information from a transmitter to a receiver. The information is sent in the form of a series of codes having redundant information. Each code sequence or codeword represents one bit of information to be transmitted. For example, a codeword of "0100110001110000" may be used to transmit a logic state of one; whereas, a codeword of "1011001110001111" may be used to transmit a logic state of zero. In this example, sixteen bits are used to represent a single information bit such that the redundancy is fifteen bits.

In operation, a transmitter transmits the codeword rather than the bit itself. On the receiver side, codewords must be decoded by a decoder. To properly decode each codeword, the decoder must know which bit is the first bit of each codeword. In other words, the operation of the decoder must be synchronized with the incoming bit stream. One readily employed technique is to identify a known synchronization pattern of repeated codewords within the incoming bit stream.

While it is possible to achieve modem acquisition under very high bit error rate conditions (e.g., exceeding 20%) in a frequency hopping communication system, current decoder synchronization methods require synchronization information to have bit error rates in the range of 10% or less for reliable synchronization. However, synchronization should occur with a much higher error tolerance in the synchronization information. Therefore, it is desirable to provide a more robust technique for identifying the synchronization pattern in an incoming bit stream, whereby reliable synchronization can occur at bit error rates in excess of 20%.

While the following description is provided in the context of a frequency hopping communication system, it is readily understood that the synchronization schemes of this disclosure are applicable to other types of communication system which employ encoded or encrypted data streams. Additionally, the statements in this section merely provide background information related to the present disclosure and may not constitute prior art.

SUMMARY

An improved method is provided for identifying a repeated codeword in an incoming bit stream. The method includes: receiving an incoming bit stream having an expected codeword repeated a number of times; determining whether a group of incoming data bits correlates to the expected codeword, where each of the incoming data bits in the group need not match the corresponding data bit of the expected codeword; and determining whether the expected code word is repeated over a sequence of incoming data bits.

Further areas of applicability will become apparent from the description provided herein. It should be understood that the description and specific examples are intended for purposes of illustration only and are not intended to limit the scope of the present disclosure.

DRAWINGS

FIG. 1 depicts an improved method for identifying a synchronization pattern in an incoming bit stream.

The drawings described herein are for illustration purposes only and are not intended to limit the scope of the present disclosure in any way.

DETAILED DESCRIPTION

FIG. 1 depicts an improved method 10 for identifying a synchronization pattern in an incoming bit stream. For illustration purposes, the synchronization pattern is comprised of a repeated codeword. Other types of synchronization patterns are contemplated by this disclosure.

Briefly, a group of incoming data bits is correlated to the expected codeword, such that the number of data bits in the group equals the number of data bits which form the expected codeword. More specifically, each data bit from the group of incoming data bits is compared at 12 to a corresponding bit in the expected codeword. When the number of incoming data bits that match corresponding data bits in the expected codeword exceeds a threshold, the group of incoming data bits is designated at 14 as the expected codeword. It is noteworthy that each of the data bits in the group need not match the corresponding data bit of the expected codeword. In other words, bit errors are tolerated in the synchronization information.

To ensure reliable synchronization in a noisy signal environment, a further assessment is conducted to determine if the codeword is properly repeated over a larger sequence of incoming bits. To do so, a designation is maintained at 16 as to when preceding groups of incoming data bits correlated to the expected codeword. The designation is maintained over a sequence of data bits which equals the expected number of times the codeword is repeated in the synch pattern. The designations are then used at 17 to determine when the expected codeword is repeated in the incoming bit stream.

An exemplary implementation of this synchronization method is further described below. Assume a synchronization pattern of four repeated codewords followed by one inverted codeword. In this example, the codeword is 11010 and the inverted codeword is 00101 such that the synchronization pattern is as follows:

1,1,0,1,0,1,1,0,1,0,1,1,0,1,0,1,1,0,1,0,0,0,1,0,1

The synchronization pattern is preceded by an arbitrary amount of phasing bits. While the number of phasing bits may be on the order of hundreds, this example assumes that only two phasing bits (1,0) precede the synchronization pattern, thereby yielding:

1,0,1,1,0,1,0,1,1,0,1,0,1,1,0,1,0,1,1,0,1,0,0,0,1,0,1

It is readily understood that this synchronization pattern is merely for illustration purposes.

For each incoming bit, the five most recent bits, including the current bit, are compared against the expected codeword. Starting with the fifth bit, the first group of incoming bits is 1,0,1,1,0. Each bit in this first group of incoming bits is compared to the corresponding bit in the expected codeword (i.e., 11010). In this case, only three of the five bits from the incoming bit stream match the expected codeword.

To determine if the first group of bits closely correlates to the expected codeword, the number of matching bits is then compared to an individual codeword correlation threshold. Assume a correlation threshold of four. When the number of matching bits equals or exceeds this threshold, the group of incoming bits closely correlates to the expected codeword. When the number of matching bits is less than this threshold, the group of incoming bits is assumed not to correlate to the expected codeword. Conversely, the number of mismatched bits may be used to determine the correlation of the incoming bits. In either case, the incoming bits need not exactly match the bits of the expected codeword. Moreover, it is envisioned that the individual codeword correlation threshold may be set and adjusted based on system performance objectives.

To ensure reliable alignment in a noisy signal environment, a further assessment is conducted to determine if the codeword is properly repeated over a larger sequence of incoming bits. In an exemplary embodiment, an M×K matrix is defined for assessing whether the expected codeword is repeated, where M the number of codewords to look across and K is a number of bits in the expected codeword. Since a five bit codeword is repeated four times, a 4×5 matrix is defined for this example. Initially, the matrix is initialized with all zeros.

Each entry in the matrix indicates whether a subset of the incoming data bits correlates to the expected codeword. When the group of incoming bits closely correlates to the expected codeword, a one serves as the cell entry. In effect, this cell entry indicates the current bit to be the last bit of an expected codeword in the synch pattern. When the group of incoming bits does not correlate to the expected codeword, a zero is the cell entry. Starting with the fifth bit, an entry in the upper left cell of the matrix is updated. Continuing with the example set forth above, the upper left cell remains a zero

| Bit 5 | Col 1 | Col 2 | Col 3 | Col 4 | Col 5 |
|---|---|---|---|---|---|
| Row 1 | 0 | 0 | 0 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 0 | | | | | |

This process is repeated for each incoming bit as further described below.

The next incoming bit (i.e., sixth bit) is appended to the preceding four bits to form the second group of incoming bits 0,1,1,0,1. The second group of bits is then correlated to the expected codeword in the manner described above. This repetitive process is further illustrated by the chart below:

| Bit Number | Last five bits (including current bit) | | | | | Number of bits correct relative to codeword | Matrix entry |
|---|---|---|---|---|---|---|---|
| 5 | 1 | 0 | 1 | 1 | 0 | 3 | 0 |
| 6 | 0 | 1 | 1 | 0 | 1 | 1 | 0 |
| 7 | 1 | 1 | 0 | 1 | 0 | 5 | 1 |
| 8 | 1 | 0 | 1 | 0 | 1 | 1 | 0 |
| 9 | 0 | 1 | 0 | 1 | 1 | 3 | 0 |
| 10 | 1 | 0 | 1 | 1 | 0 | 3 | 0 |
| 11 | 0 | 1 | 1 | 0 | 1 | 1 | 0 |
| 12 | 1 | 1 | 0 | 1 | 0 | 5 | 1 |
| 13 | 1 | 0 | 1 | 0 | 1 | 1 | 0 |
| 14 | 0 | 1 | 0 | 1 | 1 | 3 | 0 |
| 15 | 1 | 0 | 1 | 1 | 0 | 3 | 0 |
| 16 | 0 | 1 | 1 | 0 | 1 | 1 | 0 |
| 17 | 1 | 1 | 0 | 1 | 0 | 5 | 1 |

For each group of incoming bits, an entry is updated in the matrix. Moving from left to right and then top to bottom, entries in the matrix are updated as shown below.

| | Col 1 | Col 2 | Col 3 | Col 4 | Col 5 |
|---|---|---|---|---|---|
| Bit 6 | | | | | |
| Row 1 | 0 | 0 | 0 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 0 | | | | | |
| Bit 7 | | | | | |
| Row 1 | 0 | 0 | 1 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 1 | | | | | |
| Bit 8 | | | | | |
| Row 1 | 0 | 0 | 1 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 0 | | | | | |
| Bit 9 | | | | | |
| Row 1 | 0 | 0 | 1 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 0 | | | | | |
| Bit 10 | | | | | |
| Row 1 | 0 | 0 | 1 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Sum = 0 | | | | | |
| . | | | | | |
| . | | | | | |
| Bit 16 | | | | | |
| Row 1 | 0 | 0 | 1 | 0 | 0 |
| Row 2 | 0 | 0 | 1 | 0 | 0 |
| Row 3 | 0 | 0 | 0 | 0 | 0 |
| Row 4 | 0 | 0 | 0 | 0 | 0 |
| Sum = 0 | | | | | |
| Bit 17 | | | | | |
| Row 1 | 0 | 0 | 1 | 0 | 0 |
| Row 2 | 0 | 0 | 1 | 0 | 0 |
| Row 3 | 0 | 0 | 1 | 0 | 0 |
| Row 4 | 0 | 0 | 0 | 0 | 0 |
| Sum = 3 | | | | | |

In other words, the column index is incremented by one for each incoming bit. Once the column index reaches K, the column index is reset to zero and the row index is incremented by one. Once the row index reaches M, the row index is also reset to zero and the process continues with the upper left cell. In this way, the matrix contains an individual codeword correlation indicator for the M×K most recent groups of incoming data bits.

Following each cell update in the matrix, the bits in the current column are summed and then compared against a codeword repetition threshold. For this example, assume a code repetition threshold of four. If the current column sum is less than this threshold, repetition of the codeword is deemed insufficient for reliable synchronization. For instance, upon updating the matrix for the seventh bit, the sum for the third column is one. However, in a noisy signal environment, it is possible that this group of incoming bits incorrectly correlated to the expected codeword. Therefore, reliable word alignment is achieved only when the current column sum equals or exceeds the code repetition threshold.

For instance, upon updating the matrix for the seventeenth bit, the sum for the third column is three. In this case, the codeword has been repeated three times in the preceding three groups of fifteen bits. In some instances, one of four repeated codewords in the synch pattern may not have been identified as shown below.

| Bit 22 | Col 1 | Col 2 | Col 3 | Col 4 | Col 5 |
|---|---|---|---|---|---|
| Row 1 | 0 | 0 | 1 | 0 | 0 |
| Row 2 | 0 | 0 | 0 | 0 | 0 |
| Row 3 | 0 | 0 | 1 | 0 | 0 |
| Row 4 | 0 | 0 | 1 | 0 | 0 |
| | | | Sum = 3 | | |

Nonetheless, the current column sum equals the code repetition threshold, thereby indicating reliable word alignment. In other words, the code repetition threshold may be set so that not all of the codewords in the repeated pattern need to be positively identified. Again, the code repetition threshold may be set and adjusted based on system performance objectives. Once the last bit of the last repeated codeword has been identified in the sequence of incoming bits, the synchronization process may optionally verify the presence of the inverted codeword. In any case, the last bit of the synch pattern is reliably identified and the operation of the decoder may be synchronized accordingly.

The above description is merely exemplary in nature and is not intended to limit the present disclosure, application, or uses.

What is claimed is:

1. A method for identifying a repeated codeword in an incoming bit stream, comprising:
    receiving an incoming bit stream having an expected codeword repeated a number of times;
    determining whether a group of incoming data bits correlates to the expected codeword by comparing each data bit from the group of incoming data bits to a corresponding bit in the expected codeword, where the number of data bits in the group equals the number of data bits which form the expected codeword and each of the data bits in the group need not match the corresponding data bit of the expected codeword;
    designating the group of incoming data bits as the expected codeword when the number of incoming data bits that match corresponding data bits in the expected codeword exceeds a threshold;
    designating the group of incoming data bits as mismatched with the expected codeword when the number of incoming data bits that match corresponding data bits in the expected codeword is less than or equal to the threshold; and
    determining whether the expected codeword is repeated over a sequence of incoming data bits.

2. The method of claim 1 wherein determining whether the expected codeword is repeated further comprises maintaining a designation as to when preceding groups of incoming data bits correlated to the expected codeword and using the designations to determine when the expected codeword is repeated.

3. The method of claim 1 further comprises retrieving a next bit from the incoming bit stream, forming a subsequent group of data bits; and determining whether the subsequent group of incoming data bits correlates to the expected codeword.

4. The method of claim 1 further comprises maintaining the designation for the group of incoming data bits over the sequence of incoming data bits, where the sequence of incoming data bits having a length equal to a number of times the codeword is repeated.

5. A method for identifying a repeated codeword in an incoming bit stream, comprising:
    receiving a bit stream embedded with an expected codeword formed from K number of data bits and repeated M number of times;
    determining whether the K most recent data bits from the bit stream correlate to the expected codeword by comparing each data bit from the K most recent data bits to a corresponding bit in the expected codeword;
    designating the K most recent data bits as the expected codeword when the number of K most recent data bits that match corresponding data bits in the expected codeword exceeds a threshold which is less than K;
    determining whether the expected codeword is repeated over a sequence of data bits from the bit stream by maintaining a designation as to when preceding groups of incoming data bits correlated to the expected codeword and using the designations to determine when the expected codeword is repeated.

6. The method 5 further comprises repeating the steps of the process until the expected codeword is repeated in excess of a code repetition threshold.

7. A method for identifying a repeated codeword in an incoming bit stream, comprising:
    defining a M×K matrix for assessing whether an expected codeword is repeated within the incoming bit stream, where M is a number of times the codeword is repeated in the bit stream, K is the number of data bits in the expected codeword and entries in the matrix indicate whether a subset of data bits in the bit stream correlate to the expected codeword;
    receiving a current bit from the incoming bit stream;
    comparing K most recent data bits from the incoming bit stream, including the current bit, to the expected codeword;
    designating the K most recent data bits as the expected codeword when the number of K most recent data bits that match corresponding data bits in the expected codeword exceeds a threshold which is less than K;
    updating the matrix with the designation for the K most recent data bits; and
    determining whether the expected codeword is repeated in the incoming bit stream based on the matrix.

8. The method of claim 7 further comprises retrieving a next bit from the incoming bit stream and repeating the steps of comparing, designating, updating and determining whether the expected codeword is repeated.

9. The method of claim 7 wherein receiving a current bit further comprises appending the current bit to K−1 bits preceding the current bit, thereby forming the K most recent data bits.

10. The method of claim 7 wherein comparing K most recent data bits further comprises comparing each data bit from the K most recent data bits to a corresponding bit in the expected codeword.

11. The method of claim 7 further comprises designating the K most recent data bits as mismatched when the number of K most recent data bits that match corresponding data bits in the expected codeword is less than or equal to the threshold.

12. The method of claim 11 wherein updating the matrix further comprises updating entries moving from left to right in the matrix and then top to bottom in matrix.

13. The method of claim 12 further comprises wherein updating a current entry in the matrix with a one when the K most recent data bits is designated as the expected code word and a zero when the K most recent data bits are designated mismatched with the expected codeword.

14. The method of claim 13 wherein determining whether the expected codeword is repeated in the incoming bit stream further comprises summing a column in the matrix having the current entry and designating the current bit as the last bit of the expected codeword when the column sum exceeds a code repetition threshold.

15. The method of claim 14 further comprises retrieving a next bit from the incoming bit stream and repeating the process until the column sum exceeds the code repetition threshold.

* * * * *